Figure 1:
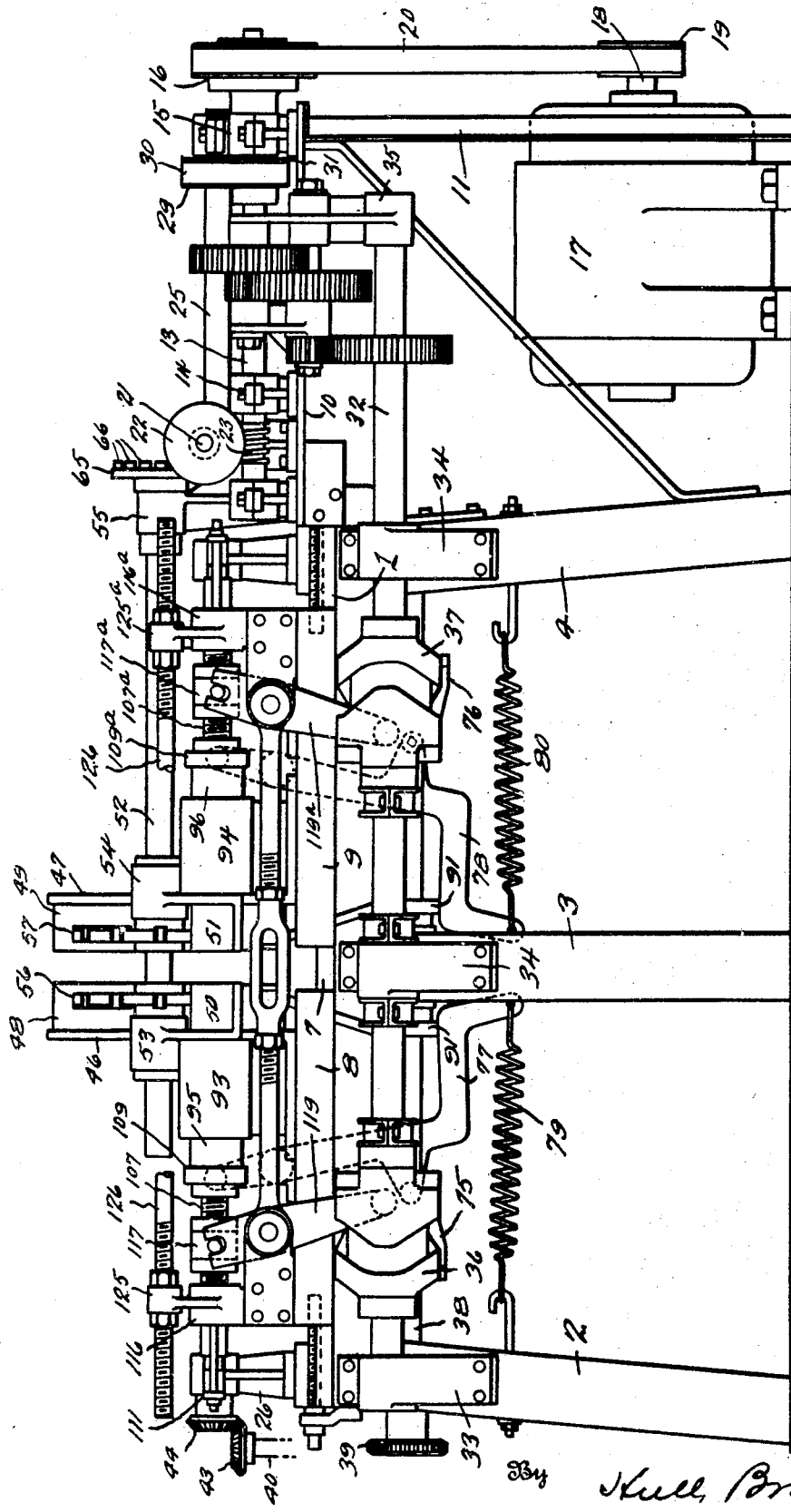

Sept. 4, 1934.  H. C. ELLISON  1,972,293

COMBINED POINTING AND EXTRUDING MACHINE

Filed July 5, 1933  13 Sheets-Sheet 1

Inventor
Harry C. Ellison
By Hull, Brock & West
Attorneys

Sept. 4, 1934.　　　　H. C. ELLISON　　　　1,972,293
COMBINED POINTING AND EXTRUDING MACHINE
Filed July 5, 1933　　　13 Sheets-Sheet 3

Inventor
Harry C. Ellison
By Hull Broch West
Attorneys

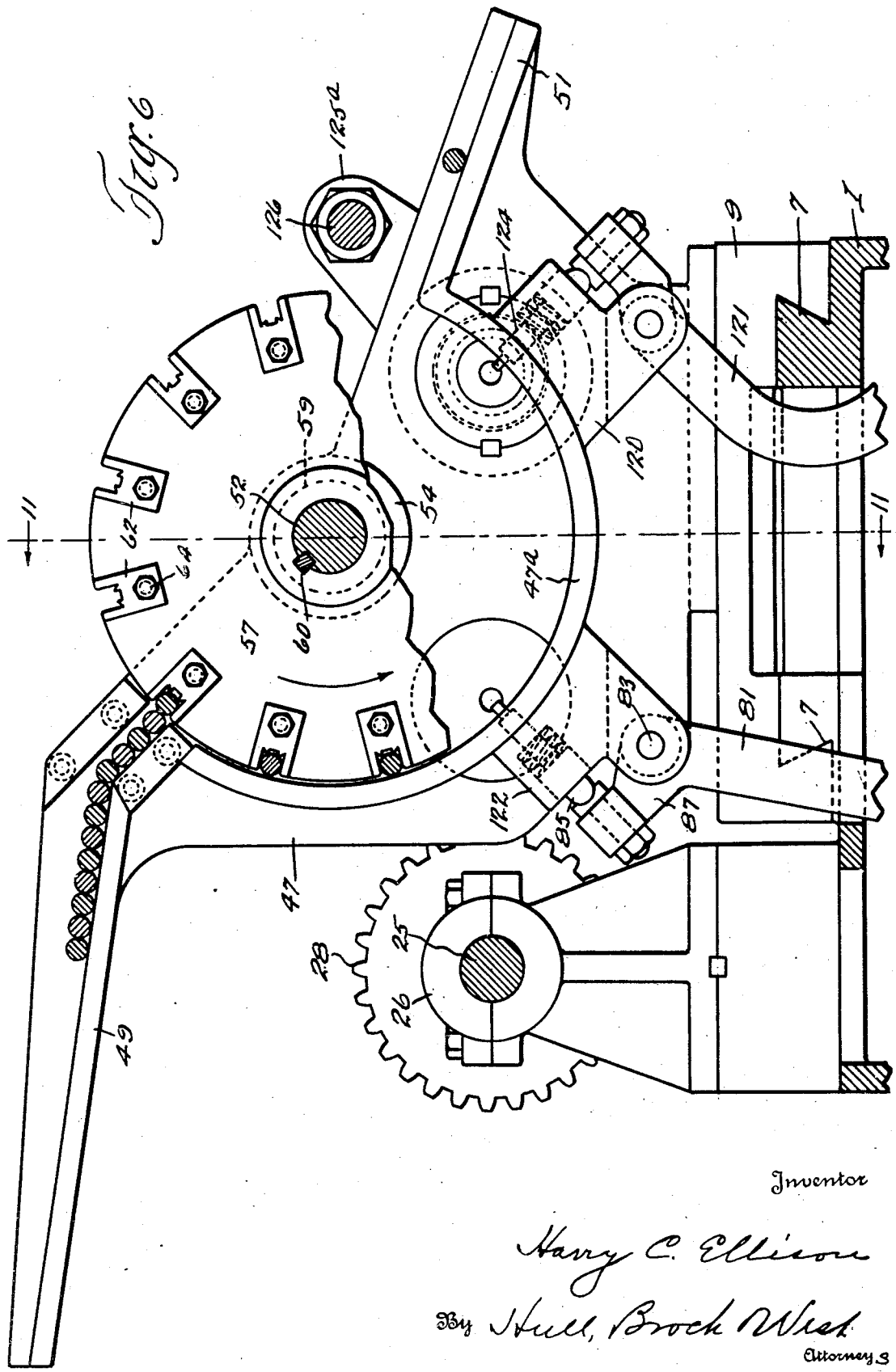

Sept. 4, 1934.　　　　H. C. ELLISON　　　　1,972,293
COMBINED POINTING AND EXTRUDING MACHINE
Filed July 5, 1933　　　13 Sheets-Sheet 7
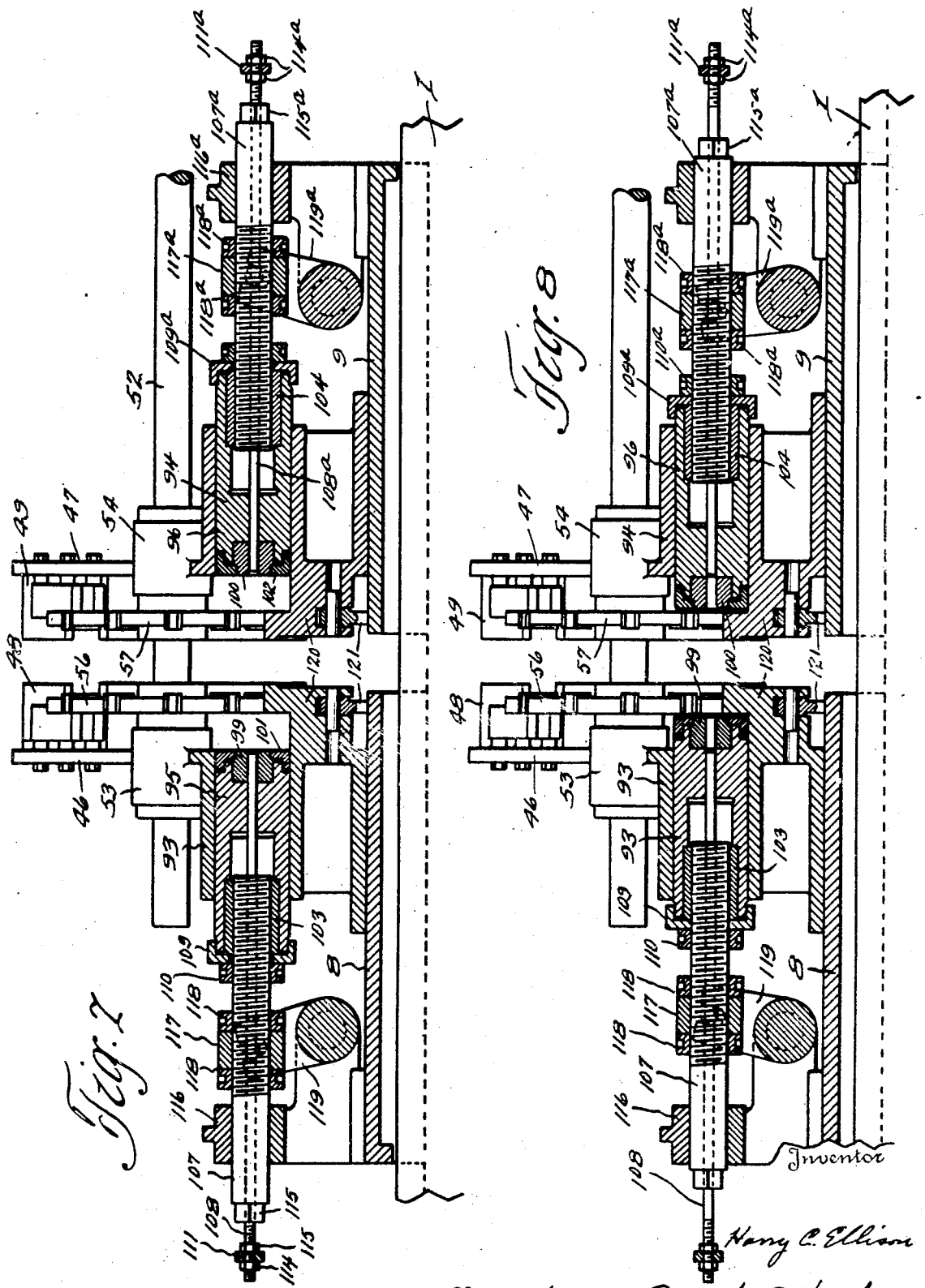

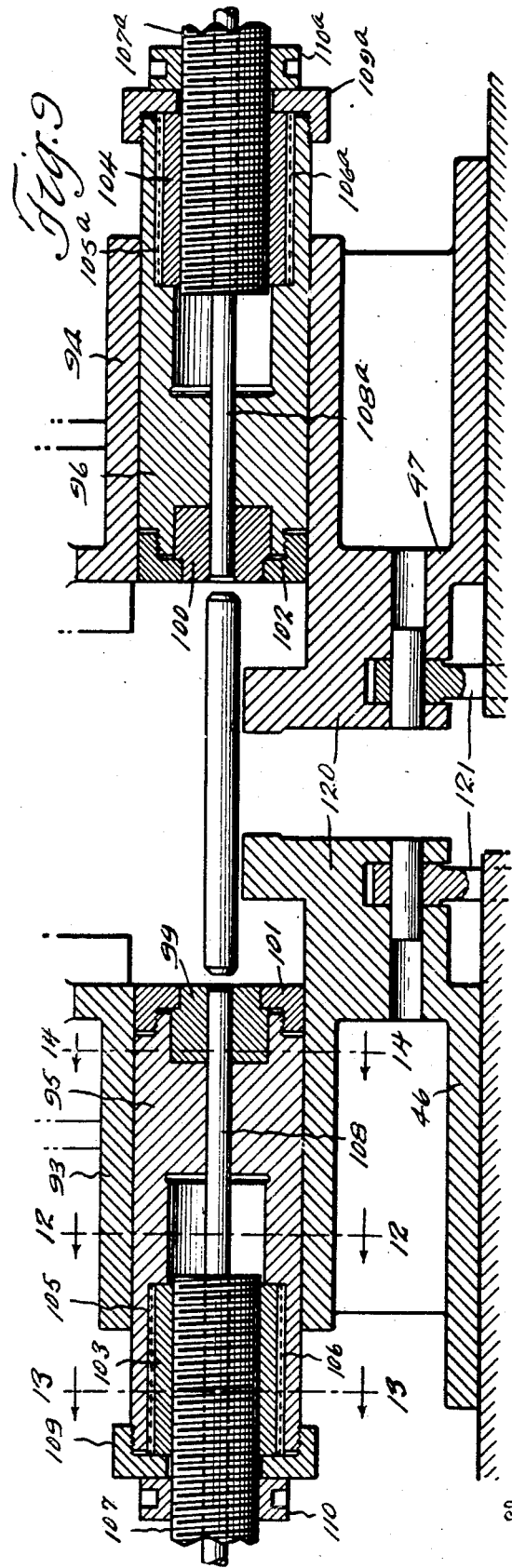
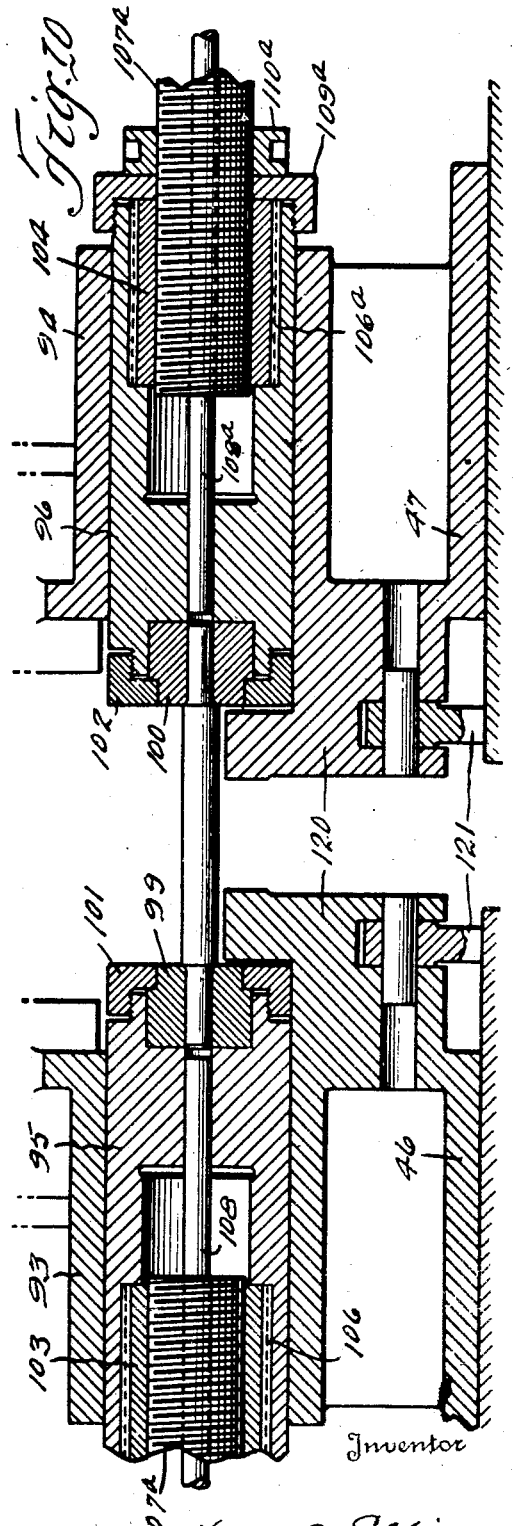

Sept. 4, 1934.                H. C. ELLISON                1,972,293
                  COMBINED POINTING AND EXTRUDING MACHINE
                     Filed July 5, 1933        13 Sheets-Sheet 9
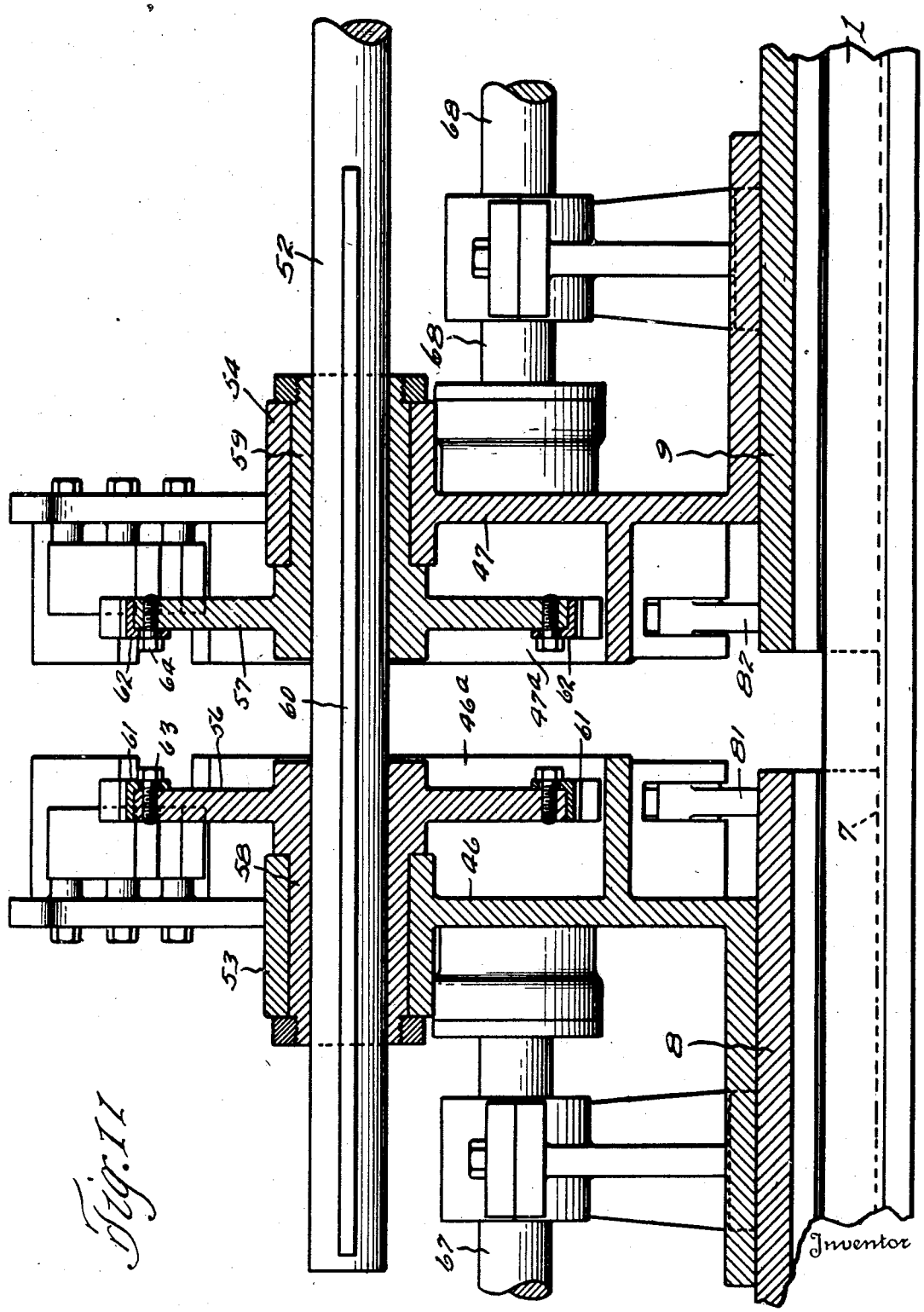
Inventor
Harry C. Ellison
By Hull, Brock & West
Attorney Sept. 4, 1934. H. C. ELLISON 1,972,293
COMBINED POINTING AND EXTRUDING MACHINE
Filed July 5, 1933 13 Sheets-Sheet 10
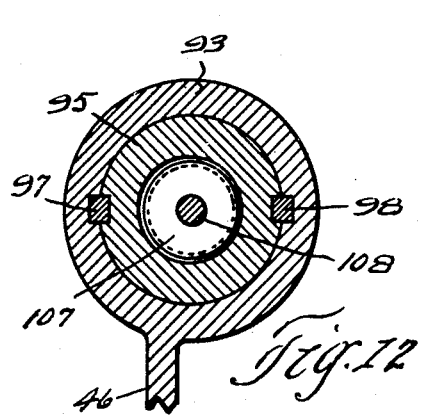
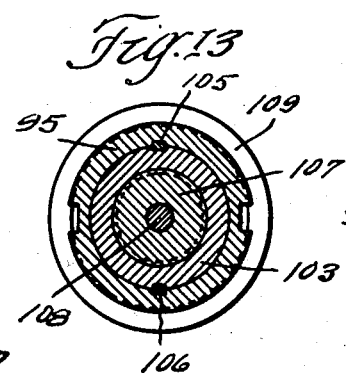
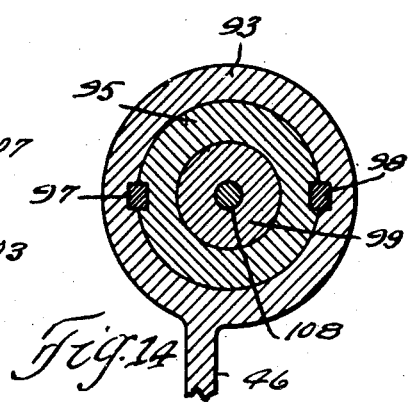
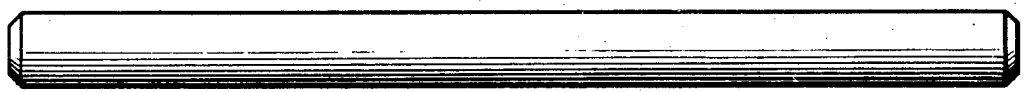
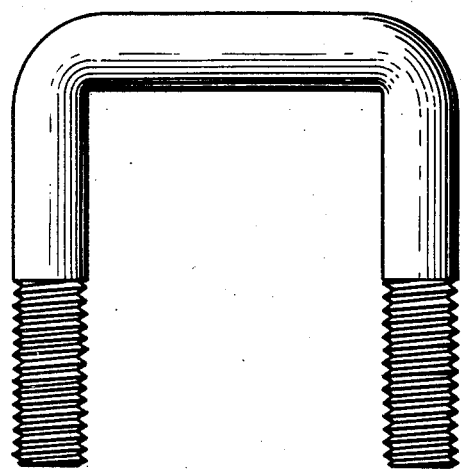
Inventor
Harry C. Ellison
By Hull, Brock & West
Attorneys

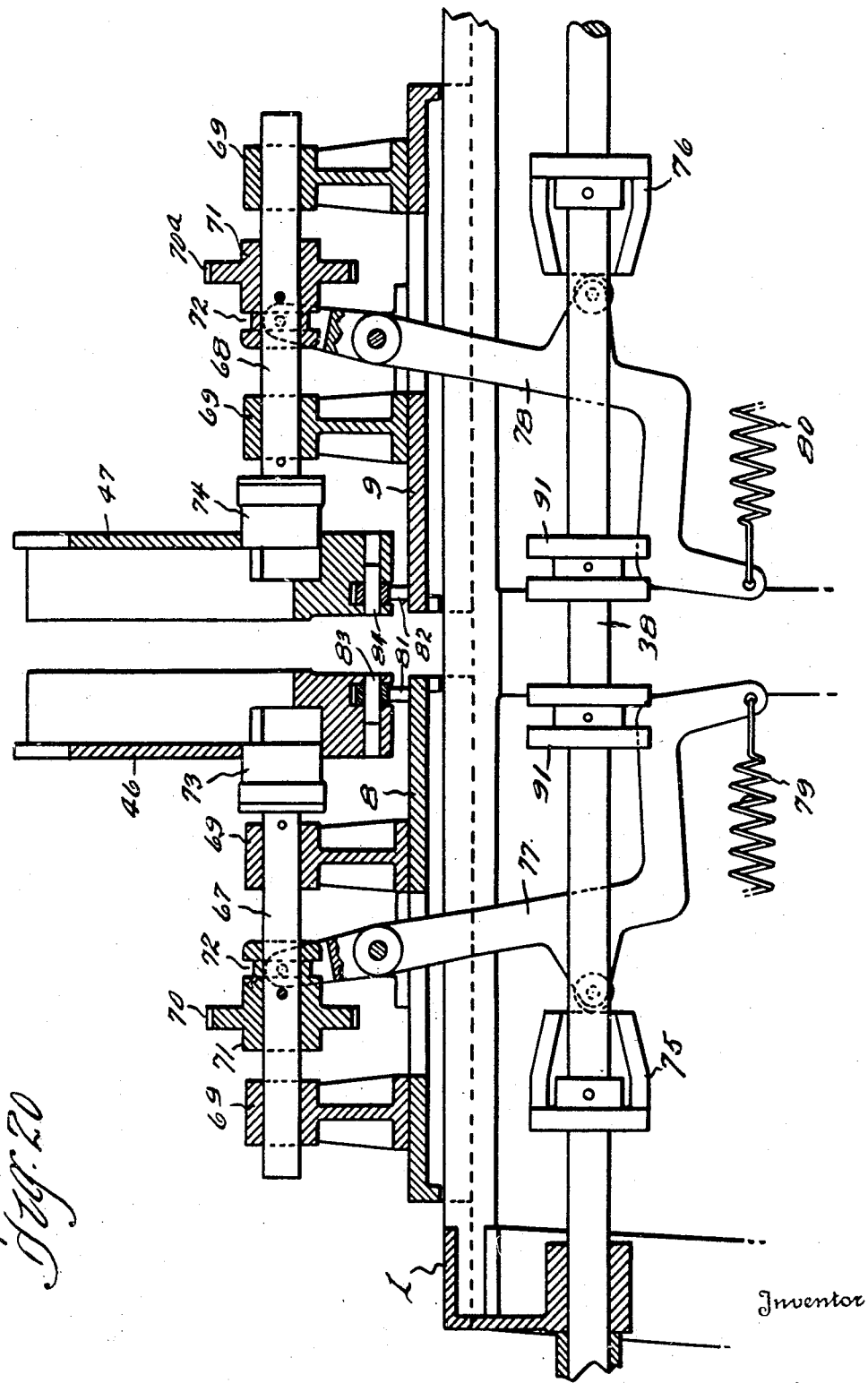

Sept. 4, 1934. H. C. ELLISON 1,972,293

COMBINED POINTING AND EXTRUDING MACHINE

Filed July 5, 1933 13 Sheets-Sheet 13

Inventor
Harry C. Ellison
By Hull, Brock & West
Attorneys

Patented Sept. 4, 1934

1,972,293

UNITED STATES PATENT OFFICE 1,972,293

COMBINED POINTING AND EXTRUDING MACHINE

Harry C. Ellison, Lakewood, Ohio, assignor to Republic Steel Corporation, Youngstown, Ohio, a corporation of New Jersey Application July 5, 1933, Serial No. 679,064

17 Claims. (Cl. 29—33)

This invention relates to a machine for pointing and extruding bolts, studs and the like, and one of the main objects of the invention is to provide a machine of this character which will perform these operations automatically and in a substantially continuous operation.

Another object of the invention is to provide a combined pointing and extruding machine of the character described which may be adjusted so as to be capable of use with bolts or studs of different diameters and lengths.

A further object of the invention is to provide a machine of the character described in which the opposite ends of the pieces of stock are simultaneously pointed; and in which the stock is then moved to a position where its opposite ends are simultaneously extruded, so that the end portions which are to be threaded are drawn out so as to be reduced to the pitch diameter of the thread to be formed.

Another object of the invention is to provide a machine of the character described which includes a carrier adapted to receive and position the bars of stock therein in spaced relation, a pointing station and an extruding station, and means for operating the carrier to move the bars of stock to the pointing station and thence to the extruding station in a substantially continuous operation, the opposite ends of the stock being simultaneously pointed and extruded.

A still further object of the invention is to provide a machine of the character described which is accurate and dependable in operation and which comprises relatively few parts which are adapted for production at comparatively low cost.

Figure 2:
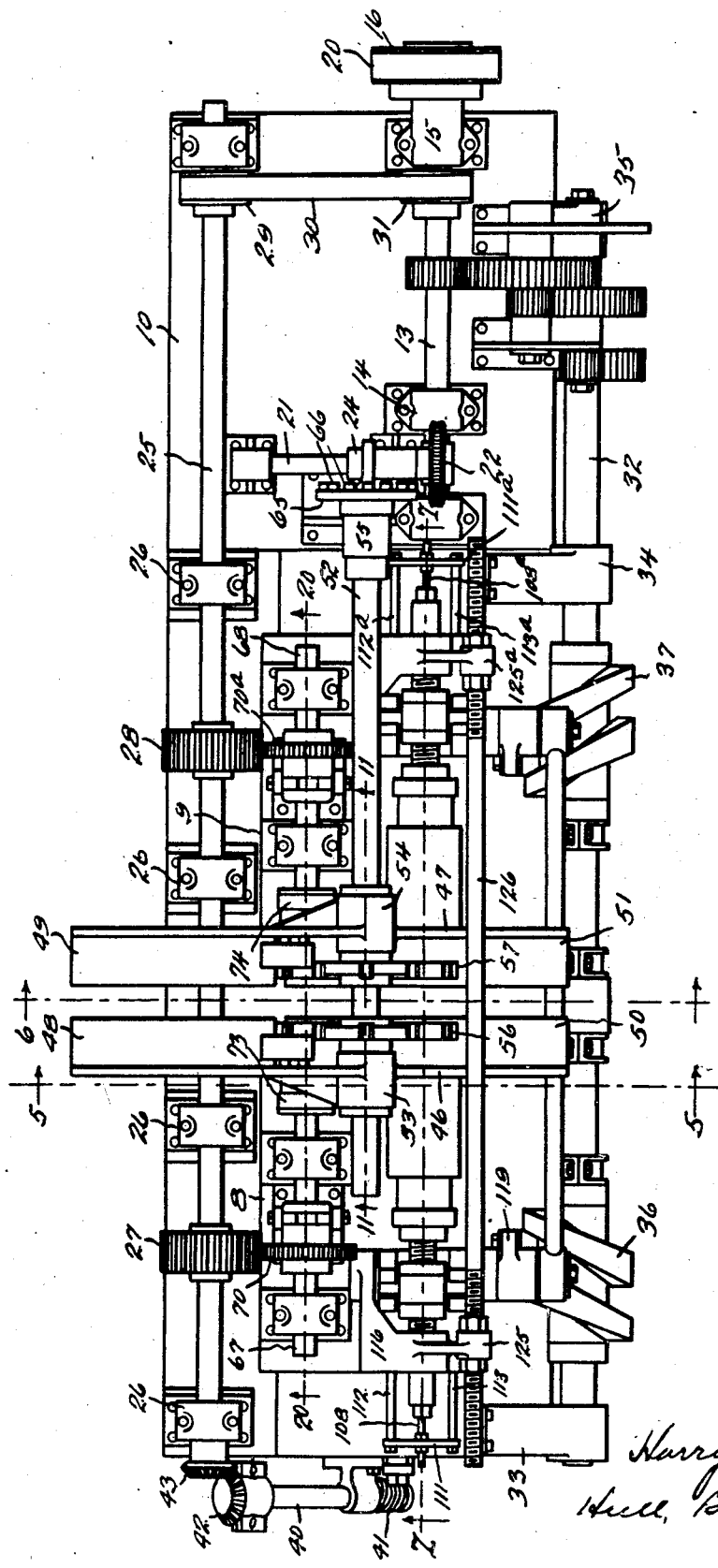
Figure 3:
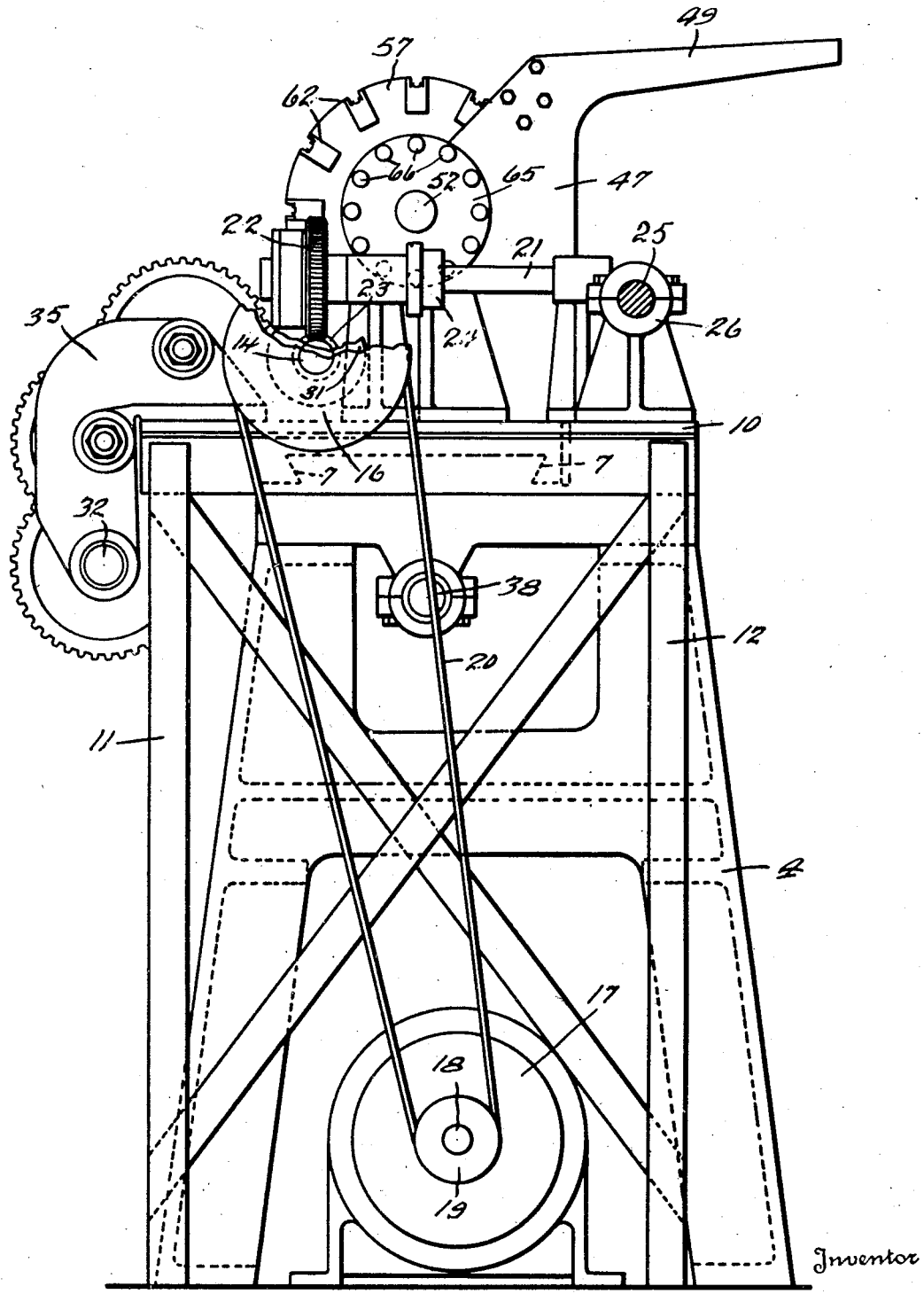
Figure 4:
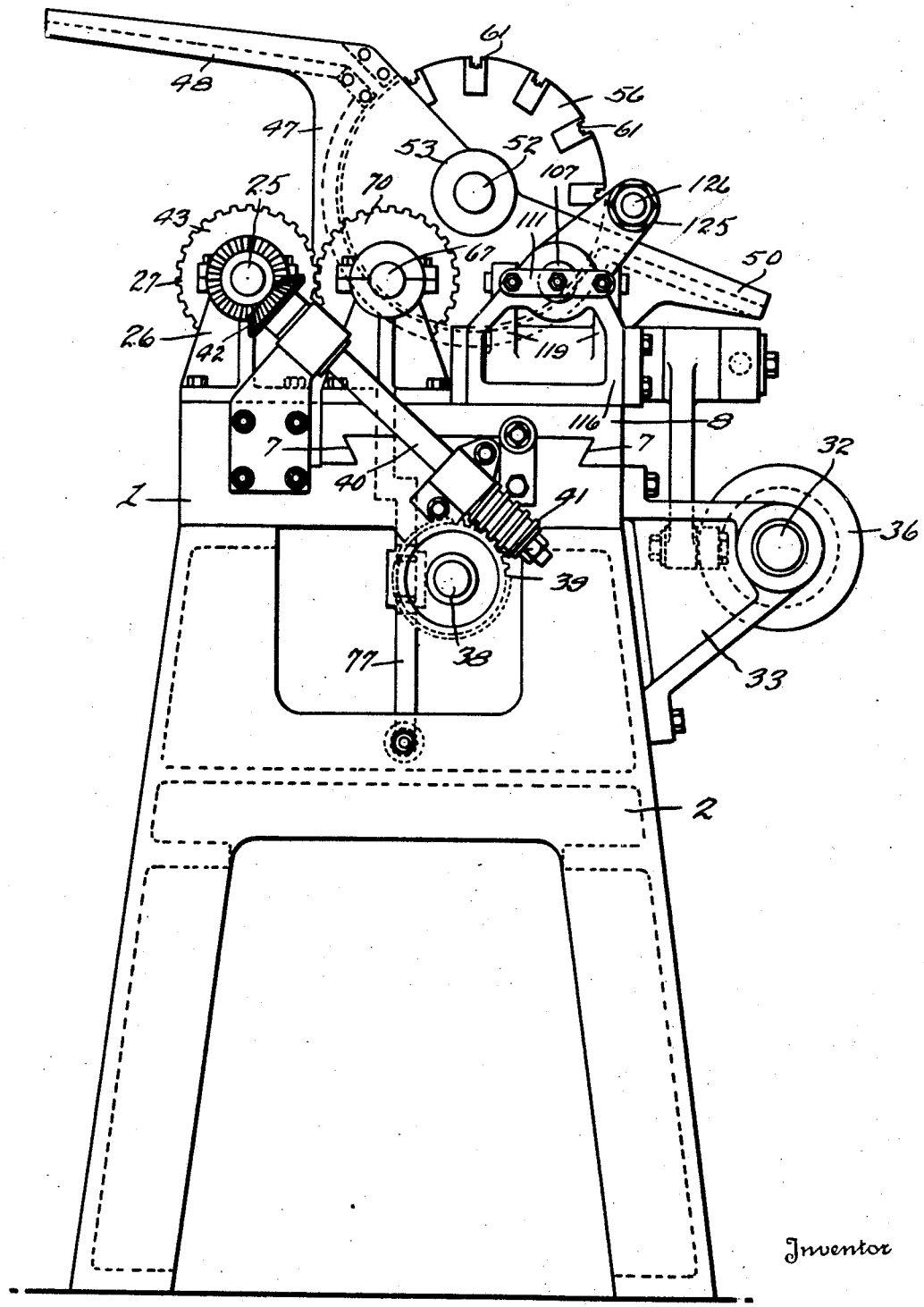
Figure 5:
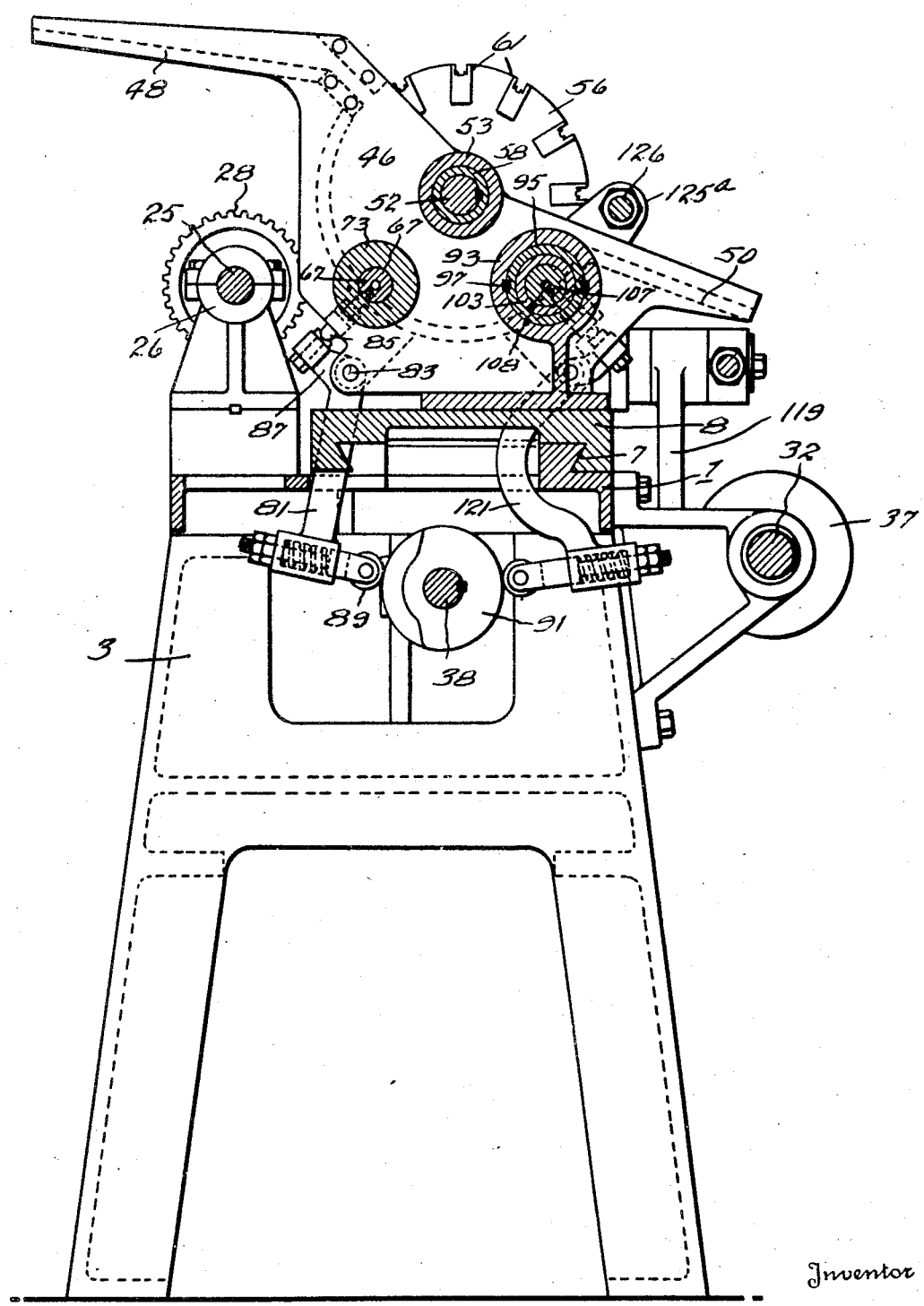
Figure 21:
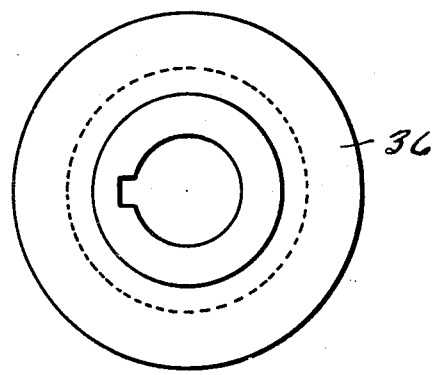
Figure 22:
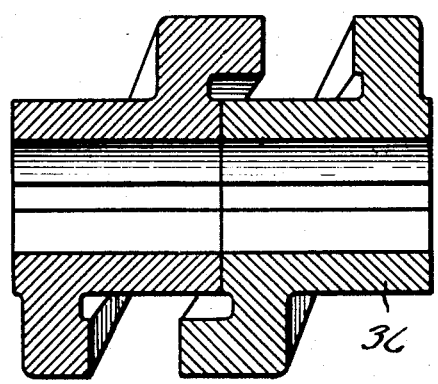
Figure 23:
Figure 24:
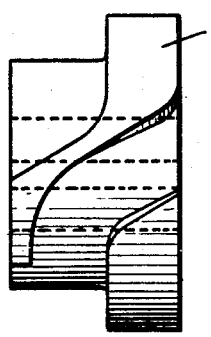
Figure 25:
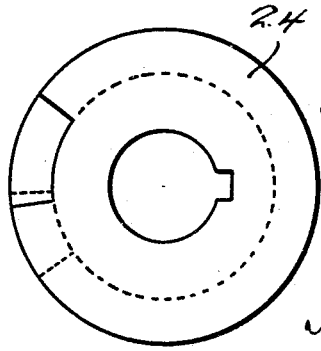
Figure 26:
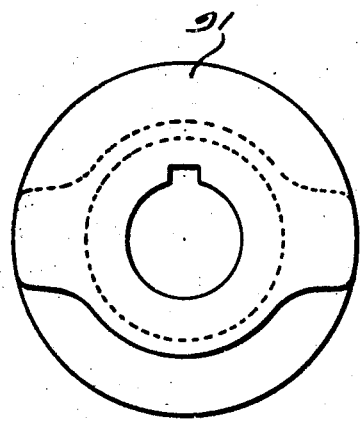
Figure 27:
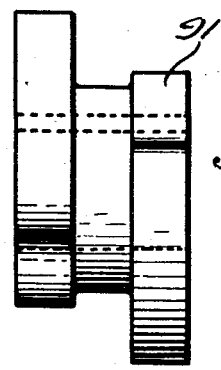
Figure 28:
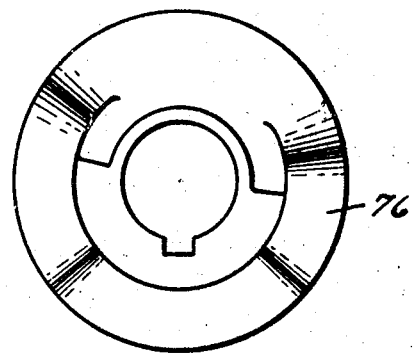
Figure 29:
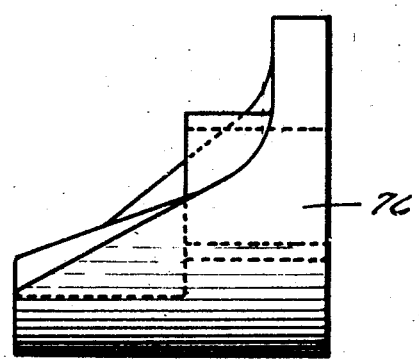
Figure 30:
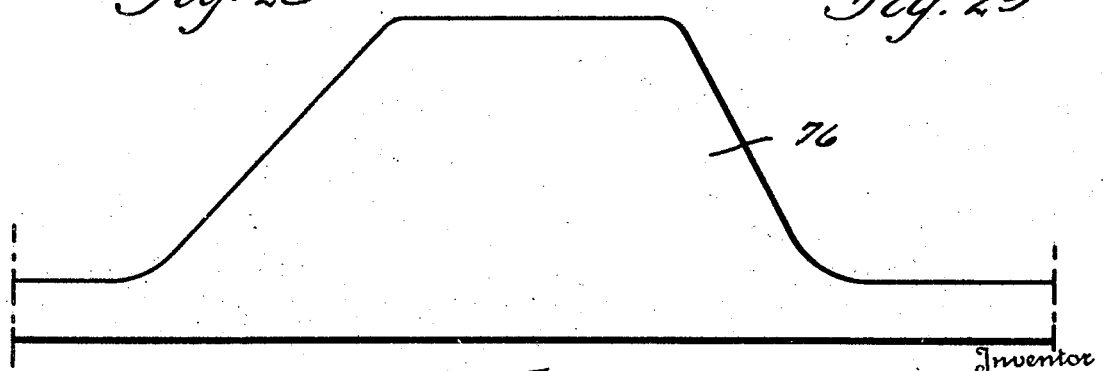

Further and more limited objects of the invention will appear as the description proceeds and by reference to the accompanying drawings in which Fig. 1 is a front elevation of my improved machine; Fig. 2 is a top plan view thereof; Fig. 3 is an end elevation looking from the right of Fig. 1; Fig. 4 is an end elevation looking from the left of Fig. 1; Fig. 5 is a section on the line 5—5 of Fig. 2; Fig. 6 is an enlarged section taken on the line 6—6 of Fig. 2 through the upper part of the machine; Fig. 7 is a vertical section through the extruding mechanism taken on the line 7—7 of Fig. 2, the parts being in the position ready to receive a bar of stock for extruding; Fig. 8 is a view similar to Fig. 7 showing the parts in the position which they assume at the end of the extruding stroke; Fig. 9 is an enlarged view similar to Fig. 7 through the extruding dies and adjacent parts showing a bar of stock in position to be extruded; Fig. 10 is a view similar to Fig. 9 showing the parts and the bar of stock in the positions assumed at the end of the extruding stroke; Fig. 11 is an enlarged sectional view on the line 11—11 of Fig. 2; Figs. 12, 13 and 14 are sectional views on the lines 12—12, 13—13 and 14—14 respectively of Fig. 9; Figs. 15 to 19 inclusive show the stock after each of the various operations performed thereon until the stock is finished into a U-bolt as shown in Fig. 19; Fig. 15 shows a bar of stock cut to predetermined length as it is fed into my machine; Fig. 16 shows the stock after the pointing operation; Fig. 17 shows the stock after the extruding operation; a comparison of Figs. 16 and 17 will show that the stock is lengthened slightly by the extruding operation; Fig. 18 shows the threads rolled on the extruded ends; Fig. 19 shows the stock after it has been bent into a U-bolt; Fig. 20 is an enlarged section through the pointing mechanism taken on the line 20—20 of Fig. 2; Figs. 21 to 23 are details of the cams for operating the extruding mechanism, Fig. 21 being an end elevation thereof, Fig. 22 being a central vertical section and Fig. 23 being a development of the camming surfaces; Figs. 24 and 25 are details of the cam for intermittently operating the feeding mechanism; Fig. 24 being a side elevation and Fig. 25 being an end elevation looking from the right of Fig. 24; Figs. 26 and 27 are details of the cams for operating the clamping mechanism, Fig. 26 being an end elevation and Fig. 27 being a side elevation thereof; Figs. 28 to 30 inclusive are details of the cam for operating the pointing mechanism; Fig. 28 being an end elevation thereof; Fig. 29 being a side elevation looking from the right of Fig. 28 and Fig. 30 being a development of the camming surface.

Referring now to the drawings and particularly to Figs. 1 to 5 inclusive, the machine consists essentially of a table 1 which is supported on suitable legs 2, 3 and 4. The top of the table is dovetailed as indicated at 7 and slidably supports a pair of plates 8 and 9 which are provided with complementary dovetailed portions which fit over the portions 7. These plates 8 and 9 are movable toward and away from each other and are secured in the desired position by any suitable clamping means. Disposed at the right hand end of the table as seen in Fig. 1, is a plate 10 which forms an extension of the table 1 and has its outer end supported by suitable legs 11 and 12. Mounted on the end plate 10 is a shaft 13 which is supported in suitable bearings 14 and 15. Carried by the outer end of the shaft 13 is a sprocket 16. Disposed adjacent this end of the machine is a motor 17 having a shaft 18 to which is connected a sprocket 19 which is operatively connected with the sprocket 16 by means of a chain 20. Also mounted on the end plate 10 is a cross shaft 21 which is mounted in suitable bearings and extends at right angles to the shaft 13. Carried by the shaft 21 is a worm wheel 22 which meshes with and is driven by a worm 23 carried by the inner end of the shaft 13. Also carried by the shaft 21 is an indexing cam 24 shown in detail in Figs. 24 and 25, the purpose of which will be hereinafter described. Extending longitudinally of the base plate is a horizontally disposed shaft 25 which is journaled in suitable bearings 26 and slidably keyed on the shaft 25 are a pair of gears 27 and 28 the purpose of which will be hereinafter described. Carried by the right hand end of the shaft 25 is a sprocket 29 which is driven from the shaft 13 through the medium of a chain 30 and a sprocket 31 carried by the shaft 13. Extending along the front of the machine is a horizontally disposed shaft 32 which is journaled in outwardly extending brackets 33, 34 and 35. Carried by the shaft 32 are a pair of cams 36 and 37 which operate the extruding mechanism to be hereinafter described. The shaft 32 is driven from the shaft 13 through suitable reducing gears, shown in Figs. 1 and 2. Mounted centrally of the machine and extending longitudinally thereof and disposed below the table is a shaft 38 which is journaled in suitable bearings. Carried by the shaft 38 is a worm gear 39. Journaled in suitable bearings on the end of the machine is a shaft 40 which carries a worm 41 which drives the worm gear 39. The shaft 40 is driven from the shaft 25 through the medium of a bevel gear 42 which meshes with a bevel gear 43 on the shaft 25.

The carrier mechanism will now be described. This mechanism consists of a pair of castings 46 and 47 which are shown in section in Fig. 11 and in elevation in Figs. 5 and 6 respectively. The castings 46 and 47 are provided with extensions 48 and 49 which extend upwardly and rearwardly to provide a chute or guide into which the stock is fed. The opposite ends of the castings are provided with extensions 50 and 51 which provide a chute or guide through which the stock is discharged. These two castings are carried by the plates 8 and 9, respectively and are secured thereto by suitable bolts and are movable with the plates. Extending through the castings 46 and 47 is a shaft 52 which is journaled in suitable bearings 53 and 54 provided in the castings 46 and 47, the opposite end of the shaft 52 being journaled in a bearing 55. Carried by the shaft 52 are a pair of disks 56 and 57, which are provided with circular extensions 58 and 59 which fit into the bearings 53 and 54 and are rotatable therein. The disks 56 and 57 are non-rotatably secured to the shaft 52 by means of a key 60. Each of the disks 56 and 57 is provided about its periphery with notches in which are secured blocks 61 and 62 which are held in place by bolts 63 and 64. These blocks in the disks are disposed in alignment with each other and receive and support the bars of stock therein in spaced relation. Non-rotatably carried by the right hand end of the shaft 52 is a disk 65 and secured on the face of the disk 65 are a plurality of outwardly projecting rollers 66 which are spaced apart and adapted to be engaged by the cam 24 on the shaft 21 which imparts an intermittent movement to the shaft 52. This indexing mechanism is a sort of a modified Geneva movement and serves to impart an intermittent movement to the carrier to move the stock to the pointing mechanism and thence to the extruding mechanism to be hereinafter described. The castings 46 and 47 are provided with inwardly directed flanges 46ª and 47ª which extend toward each other and partially surround the disks 56 and 57 and serve to hold the bars of stock within the notches in the disks while the carrier mechanism is moving the stock from the receiving station to the discharging station (see Fig. 11).

The pointing mechanism will now be described (see Figs. 2 and 20). Carried by the plates 8 and 9 are a pair of shafts 67 and 68 which are slidably journaled in suitable bearings 69. Carried by the shaft 67 and non-rotatably secured thereto is a gear 70 which meshes with and is driven by the gear 27 on the shaft 25. The shaft 68 is driven in a similar manner through the medium of a gear 70ª which meshes with the gear 28 on shaft 25. The gears 70 and 70ª are each provided with an extended portion 71 in which is an annular recess 72 the purpose of which will hereinafter appear. Carried by the adjacent ends of the shafts 67 and 68 are a pair of pointing heads 73 and 74 which are moved toward and away from each other by mechanism to be hereinafter described. The pointing heads are shown in retracted position in Fig. 20. Carried by the shaft 38 are a pair of cams 75 and 76 shown in detail in Figs. 28, 29 and 30. Carried by the plates 8 and 9, respectively, are a pair of angular levers 77 and 78. These angular levers are pivotally supported upon brackets provided upon the plates 8 and 9 and project through openings provided therein. The upper ends of the levers 77 and 78 are provided with yokes which engage in the recesses 72 provided in the extended portions 71 of the gears 70 and 70ª. Connected with the lower ends of the levers 77 and 78 are a pair of coil springs 79 and 80 the opposite ends of which are connected with the frame of the machine in such a manner as to urge the shafts 67 and 68 toward each other. Each of the levers 77 and 78 is provided with a projecting portion which engages with the cams 75 and 76 respectively in such a manner that the cams move the levers away from each other simultaneously against the tension of the coil springs 79 and 80. As the shafts 67 and 68 are slidably mounted in their bearings, it will be seen that the two shafts are moved toward and away from each other and serve to move the pointing heads 73 and 74 into engagement with the bars of stock which are carried by the carrier so that the opposite ends of the bars of stock are pointed simultaneously. The pointing heads move through openings provided in the castings 46 and 47.

The mechanism for holding the bars of stock during the pointing operation and the extruding operation will now be described (see particularly Figs. 5, 6 and 11). Pivotally mounted on the castings 46 and 47 are a pair of cranks 81 and 82 which are pivotally supported as at 83 and 84. Also carried by the castings 46 and 47 are a pair of plungers 85 which are normally urged outwardly by means of coil springs. The levers or cranks 81 and 82 are each provided at their upper ends with projecting portions 87 which are adapted to engage the plungers 85. The lower ends of the cranks or levers 81 and 82 are provided with spring pressed rollers 89. Carried by the shaft 38 are a pair of cams 91 (shown in detail in Figs. 26 and 27) which engage the rollers 89 and move the lower ends of the levers outwardly and the upper ends thereof into engagement with the plungers 85 which are moved into engagement with the bars of stock to clamp them during the pointing and extruding operations.

The extruding mechanism will now be described (see particularly Figs. 1, 2, 7, 8, 9, 10, 12, 13 and 14). The castings 46 and 47 are provided with cylindrical extensions 93 and 94 in which are mounted cylindrical blocks 95 and 96 which are held against rotation by means of keys 97 and 98. Secured within the adjacent ends of the blocks 95 are a pair of dies 99 and 100 which are cylindrical in shape and provided with a central circular bore. The dies 99 and 100 are held in place by threaded ring members 101 and 102. Secured in the rear ends of each of the blocks 95 and 96 are sleeves 103 and 104 which are held against rotation with respect to the blocks by means of keys 105 and 106 and 105ª and 106ª. The sleeves 103 and 104 are interiorly threaded and secured therein are a pair of hollow shafts 107 and 107ª. Each of the shafts 107 and 107ª is provided with a central bore in which are positioned rods 108 and 108ª which extend through openings provided in the blocks 95 and 96 and through openings provided in the die members 99 and 100. The sleeves 103 and 104 are held in place by nuts 109 and 109ª, and the shafts 107 and 107ª are held in the adjusted position by means of nuts 110 and 110ª. The opposite ends of the rods 108 and 108ª are threaded and extend through cross heads 111 and 111ª which are secured to the arms 112, 113 and 112ª, 113ª. The position of the rods 108 and 108ª may be adjusted as desired and the rods are secured in place by means of lock nuts 114 and 114ª which are disposed on opposite sides of the cross pieces 111 and 111ª, respectively. The shafts 107 and 107ª are provided at their outer ends with squared portions 115 and 115ª adapted to receive a wrench thereover whereby to adjust the positions of the shafts. Carried by the plates 8 and 9 are bearing blocks 116 and 116ª which receive the outer ends of the shafts 107 and 107ª therethrough and serve to guide the same. The shafts 107 and 107ª are exteriorly threaded and secured thereover are a pair of collars 117 and 117ª which are secured in the adjusted position by means of lock nuts 118 and 118ª. Pivotally mounted on the plates 8 and 9 are a pair of cranks or levers 119 and 119ª the upper ends of which engage with projections provided on the collars 117 and 117ª and the lower ends of which are provided with rollers which engage in cam grooves provided in the cams 36 and 37 on the shaft 32. In Figs. 7 and 9 the extruding dies are shown in the position which they occupy at the beginning of the extruding stroke and in Figs. 8 and 10 the parts are shown in the position which they occupy at the end of the extruding stroke. The cranks 119 and 119ª move the extruding dies toward and away from each other. The effective stroke of the dies can be varied by adjusting the position of the shafts 107 and 107ª within the sleeves 103 and 104. The rods 108 and 108ª extend through the forming dies to a point adjacent the ends of the bars of stock and serve to prevent undue displacement of the bars of stock in either direction and to assist the removal of the stock from the extruding dies. It will be seen that the blocks 95 and 96 have a sliding movement in the cylindrical extensions 93 and are held against rotation with respect thereto. The bars of stock are held against movement with respect to the carrier by clamping mechanism which will now be described (see Figs. 6 to 10 inclusive). The castings 46 and 47 are provided with bosses 120 on which are pivotally mounted a pair of cranks 121. Also carried by the bosses 120 are a pair of spring pressed plungers 124 which are normally urged outwardly by means of coiled springs. The cranks 121 are provided at their upper ends with extended portions which are adapted to engage the plungers 124. The lower ends of the cranks 121 are provided with spring pressed rollers which engage with and are operated by the cams 91 on the shaft 38. When the lower ends of these cranks are moved outwardly, the upper ends of the cranks engage the plungers 124 and urge them into engagement with the bars of stock supported upon the carrier to hold the same against movement during the extruding operation. It will be seen that the mechanisms for holding the bars of stock during the pointing and the extruding operations are both actuated simultaneously by the cams 91. The bearing blocks 116 and 116ª have formed integral therewith brackets 125 and 125ª through which extend a reinforcing tie rod 126 which is threadedly engaged in the brackets and which is secured in place by lock nuts.

The operation of the machine is as follows: The motor shaft 18 drives the shaft 13 through the medium of the chain 20 and sprocket 16. The shaft 21 is operated from the shaft 13 through the medium of the worm 23 and worm wheel 22. The cam 24 on the shaft 21 operates the indexing mechanism which imparts an intermittent movement to the carriers through the shaft 52. The shaft 25 is also driven from the shaft 13 through the sprocket 31, chain 30 and sprocket 29 thus imparting movement to the gears 27 and 28 which mesh with and drive the gears 70 and 70ª, respectively, for rotating the pointing mechanism. The shaft 38 is driven from the shaft 25 through mechanism hereinbefore described, and operates the cams 91 which in turn operate the holding mechanism for clamping the bars of stock during the pointing and extruding operations. The shaft 32 is driven from the shaft 13 through the medium of the reducing gearing hereinbefore described, and operates the cams 36 and 37 which in turn operate the extruding dies. The bars of stock are fed into the carrier and received in the aligned notches in the disks 56 and 57 which are moved by intermittent movement to position the bars to be operated upon by the pointing mechanism. Continued intermittent motion of the carrier moves the bars of stock to the extruding station where the opposite ends of the stock are simultaneously extruded. Further movement of the carrier causes the bars of stock to be delivered from the machine through the guides 50 and 51. Should it be desired to adjust the machine for stock of different length or diameter, the plates 8 and 9 may be moved toward or away from each other which will separate the carrier disks. Corresponding adjustments of the several cams, cranks and levers will also be necessary. The forming dies and pointing heads may also be readily replaced when necessary.

It will now be clear that I have provided a combined pointing and extruding machine which will accomplish the objects of the invention as hereinbefore stated. It will also be seen that I have provided a machine which will perform the pointing and extruding operations automatically and in a substantially continuous operation. The machine is also capable of adjustment for pointing and extruding bolts of various sizes. It is, of course, to be understood that various changes may be made in the details of construction as well as in the shape, size and arrangement of parts without departing from the spirit of my invention; and that the embodiment of the invention herein disclosed is merely illustrative and is not to be considered in a limiting sense as the invention is limited only in accordance with the scope of the appended claims.

Having thus described my invention, what I claim is:

1. A combined pointing and extruding machine of the character described, comprising means for simultaneously pointing opposite ends of bars of stock, means for simultaneously extruding the opposite ends of the bars of stock, means for moving the stock intermittently from the pointing station to the extruding station and means for holding the stock against movement during the pointing and extruding operations, said last mentioned means including a plurality of holding plungers adapted to be moved into engagement with the stock and means for simultaneously operating said plungers.

2. A combined pointing and extruding machine comprising a carrier adapted to receive and support bars of stock thereon in spaced relation, a pair of pointing heads disposed on opposite sides of said carrier, means for moving said pointing heads toward and away from each other so as to simultaneously point the opposite ends of a bar of stock, a pair of extruding dies disposed on opposite sides of said carrier, means for moving the extruding dies toward and away from each other so as to simultaneously extrude the opposite ends of a bar of stock, means for imparting an intermittent motion to said carrier, and means for adjusting the position of said carrier with respect to said pointing heads and said extruding dies.

3. A machine for simultaneously extruding the opposite ends of bars of stock comprising a conveyor adapted to receive and position bars of stock thereon in spaced relation, a pair of shafts disposed on opposite sides of said carrier each of which is made up of a plurality of adjustable sections, an extruding die rigidly secured to each of said shafts, means for imparting a reciprocatory motion to said shafts whereby to move said dies toward and away from each other simultaneously.

4. A machine for simultaneously extruding the opposite ends of bars of stock comprising a conveyor adapted to receive and position bars of stock thereon in spaced relation, a pair of shafts disposed on opposite sides of said carrier each of which is made up of a plurality of adjustable sections, an extruding die rigidly secured to each of said shafts, means for imparting a reciprocatory motion to said shafts whereby to move said dies toward and away from each other simultaneously, and means for disengaging the bars of stock from said dies.

5. A combined pointing and extruding machine of the character described comprising a base, a stock carrier, adapted to receive and position bars of stock, mounted thereon, a pointing head and a die carrier adjacent said stock carrier and spaced from each other, an extruding die mounted on said die carrier, means for operating said stock carrier to move the stock into alignment with said pointing head and thence into alignment with said extruding die, and means operating said pointing head and said extruding die when the stock is in alignment therewith.

6. A combined pointing and extruding machine of the character described, comprising a base, a stock carrier, adapted to receive and position bars of stock, mounted thereon, a pair of pointing heads adjacent said stock carrier one on each side thereof, a pair of die carriers diametrically opposite each other one on each side of said carrier, an extruding die mounted on each of said die carriers, means for operating said stock carrier to move the stock into alignment with said pointing heads and thence into alignment with said extruding dies, and means for operating said pointing heads and said extruding dies when the stock is in alignment therewith.

7. A combined pointing and extruding machine of the character described comprising a base, a stock carrier, adapted to receive and position bars of stock, mounted thereon, a pointing head and a die carrier adjacent said stock carrier and spaced from each other, an extruding die mounted on said die carrier, means for operating said stock carrier to move the stock into alignment with said pointing head and thence into alignment with said extruding die, means for clamping the stock when it is in alignment with said pointing head and said extruding die, and means for operating said pointing head and said extruding die when the stock is in alignment therewith.

8. A combined pointing and extruding machine of the character described comprising a base, a pair of pointing heads thereon, a pair of die carriers adjacent said pointing heads, an extruding die mounted on each of said die carriers, a stock carrier adapted to receive and position bars of stock, means for operating said stock carrier to move bars of stock between said pointing heads and into alignment therewith and then between said extruding dies in alignment therewith, means for operating said pointing heads to simultaneously point the opposite ends of the stock, and means for operating said extruding dies to simultaneously extrude the opposite ends of the bars of stock.

9. A combined pointing and extruding machine of the character described comprising a base, a pair of pointing heads thereon, a pair of die carriers adjacent said pointing heads, an extruding die mounted on each of said die carriers, a stock carrier adapted to receive and position bars of stock, means for operating said stock carrier to move bars of stock between said pointing heads and into alignment therewith and then between said extruding dies in alignment therewith, and means for operating said pointing heads and said extruding dies to simultaneously point the opposite ends of one bar of stock and to extrude the opposite ends of another bar of stock.

10. A combined pointing and extruding machine of the character described comprising a turret having a plurality of spaced pockets adapted to receive bars of stock therein, a pointing head and a die carrier adjacent said turret and spaced from each other, an extruding die mounted on said die carrier, means for operating said turret with an intermittent motion to move the stock first into alignment with the pointing head and thence into alignment with the extruding die, and means for operating the pointing head to point the stock and means for operating the extruding die to extrude the stock.

11. A combined pointing and extruding machine of the character described comprising a base, a stock carrier, adapted to receive and position bars of stock, mounted thereon, a pointing head and a die carrier adjacent said stock carrier and spaced from each other, an extruding die mounted on said die carrier, means for operating said stock carrier to move the stock into alignment with said pointing head and thence into alignment with said extruding die, means operating said pointing head and said extruding die when the stock is in alignment therewith, and means for adjusting the positions of said pointing head and said extruding die to accommodate the machine for use with different size stock.

12. A combined pointing and extruding machine of the character described comprising a base, a pair of pointing heads thereon, a pair of die carriers adjacent said pointing heads, an extruding die mounted on each of said die carriers, a stock carrier adapted to receive and position bars of stock, means for operating said stock carrier to move bars of stock between said pointing heads and into alignment therewith and then between said extruding dies in alignment therewith, means for operating said pointing heads to simultaneously point the opposite ends of the stock, means for operating said extruding dies to simultaneously extrude the opposite ends of the bars of stock, and means for adjusting the positions of said pointing head and said extruding die to accommodate the machine for use with different size stock.

13. In a combined pointing and extruding machine, the combination of a base, a stock carrier and a plate mounted on said base, a pointing mechanism and an extruding mechanism mounted on said plate, means for moving said pointing and extruding mechanisms toward and away from said carrier, means for intermittently operating said carrier to move a bar of stock first to a position to be pointed and thence to a position to be extruded, and means for adjusting said plate, and the mechanisms carried thereby with respect to said carrier, thereby to accommodate the machine for use with different length stock.

14. In a combined pointing and extruding machine, the combination of a base, a carrier mounted thereon, a pair of plates mounted on said base one on each side of said carrier, pointing mechanism mounted on each of said plates in alignment with each other, extruding mechanism mounted on each of said plates in alignment with each other, means for simultaneously moving said pointing mechanism toward and away from each other, means for simultaneously moving said extruding mechanism toward and away from each other, means for intermittently operating said carrier thereby to move a bar of stock first to the pointing mechanism and then to the extruding mechanism, and means for adjusting said plates, and the mechanism carried thereby, on the base, thereby to accommodate the machine for use with different size stock.

15. A machine for simultaneously extruding the opposite ends of bars of stock comprising a stock carrier adapted to receive and position bars of stock thereon in spaced relation, a pair of slides disposed on opposite sides of said carrier, an extruding die secured to each of said slides, and means for imparting a reciprocatory motion to said slides whereby to move said dies toward and away from each other simultaneously.

16. A machine for simultaneously extruding the opposite ends of bars of stock comprising a stock carrier adapted to receive and position bars of stock thereon in spaced relation, a pair of die carriers disposed on opposite sides of said stock carrier, an extruding die secured to each of said die carriers, and means for imparting a reciprocatory motion to said die carriers whereby to move said dies toward and away from each other simultaneously.

17. A machine for simultaneously extruding the opposite ends of bars of stock comprising a stock carrier adapted to receive and position bars of stock thereon in spaced relation, a pair of die carriers disposed on opposite sides of said carrier, an extruding die secured to each of said carriers, means for imparting a reciprocatory motion to said die carriers whereby to move said dies toward and away from each other simultaneously, and means for adjusting the position of said extruding dies with respect to said stock carrier.

HARRY C. ELLISON.